(12) United States Patent
Moallemi et al.

(10) Patent No.: US 8,600,373 B2
(45) Date of Patent: Dec. 3, 2013

(54) DYNAMIC DISTRIBUTION OF DEVICE FUNCTIONALITY AND RESOURCE MANAGEMENT

(75) Inventors: Kamran Moallemi, Del Mar, CA (US); Amal Ekbal, San Diego, CA (US); Chong U. Lee, San Diego, CA (US); David Jonathan Julian, San Diego, CA (US); Manuel E. Jaime, Solana Beach, CA (US); Zhanfeng Jia, Belmont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 918 days.

(21) Appl. No.: 11/740,614

(22) Filed: Apr. 26, 2007

(65) Prior Publication Data

US 2007/0254728 A1    Nov. 1, 2007

Related U.S. Application Data

(60) Provisional application No. 60/795,445, filed on Apr. 26, 2006, provisional application No. 60/795,436, filed on Apr. 26, 2006.

(51) Int. Cl.
*H04W 24/00* (2009.01)
*H04M 3/42* (2006.01)

(52) U.S. Cl.
USPC ........................ 455/425; 455/414.1

(58) Field of Classification Search
USPC ....................................... 455/445
See application file for complete search history.

(56) References Cited

U.S. PATENT DOCUMENTS 4,796,004 A   1/1989   Rich et al.
5,196,825 A   3/1993   Young
(Continued)

FOREIGN PATENT DOCUMENTS

CN    1647458 A    7/2005
CN    1722785 A    1/2006
(Continued)

OTHER PUBLICATIONS

Chiasserini, C.F. and Rao, R R: "On the concept of distributed digital signal processing in wireless sensor networks," (Oct. 7, 2002), pp. 260-264, XP010632110, IEEE Military Communications Conference. Milcom 2002. Proceedings Anaheim, CA.

(Continued)

*Primary Examiner* — Charles Appiah
*Assistant Examiner* — Natasha Cosme
(74) *Attorney, Agent, or Firm* — Paul S. Holdaway (57) ABSTRACT

Aspects include methods and apparatuses for communicating in an ultra-wideband transmission. For example, some aspects include methods and apparatuses for wireless communications. The method includes, at a first device in communication with at least a second device via a wireless link, monitoring at least one resource for performing at least one function. The method further includes determining whether to assign the at least one function to the at least one second device. The determining is based on information that is indicative of at least one function and indicative of at least one resource of the at least one second device. Other aspects include apparatus and devices for communicating data, including according to one or more aspects of the method. For example, some aspects include devices such as headsets, watches, and medical devices configured to use such methods and apparatuses for communicating data.

71 Claims, 6 Drawing Sheets

(56) References Cited

U.S. PATENT DOCUMENTS

| | | |
|---|---|---|
| 5,225,842 A | 7/1993 | Brown et al. |
| 5,298,904 A | 3/1994 | Olich |
| 5,341,481 A | 8/1994 | Tsukamoto |
| 5,406,284 A | 4/1995 | Lin et al. |
| 5,479,522 A | 12/1995 | Lindemann et al. |
| 5,617,058 A | 4/1997 | Adrian et al. |
| 5,687,169 A | 11/1997 | Fullerton |
| 5,742,772 A | 4/1998 | Sreenan |
| 5,764,696 A | 6/1998 | Barnes et al. |
| 5,812,081 A | 9/1998 | Fullerton |
| 5,832,035 A | 11/1998 | Fullerton |
| 5,907,427 A | 5/1999 | Scalora et al. |
| 5,933,582 A | 8/1999 | Yamada |
| 5,952,956 A | 9/1999 | Fullerton |
| 5,956,681 A | 9/1999 | Yamakita |
| 5,956,683 A | 9/1999 | Jacobs et al. |
| 5,960,031 A | 9/1999 | Fullerton et al. |
| 5,963,581 A | 10/1999 | Fullerton et al. |
| 5,969,663 A | 10/1999 | Fullerton et al. |
| 5,995,534 A | 11/1999 | Fullerton et al. |
| 6,028,853 A | 2/2000 | Haartsen |
| 6,031,862 A | 2/2000 | Fullerton et al. |
| 6,091,374 A | 7/2000 | Barnes |
| 6,111,536 A | 8/2000 | Richards et al. |
| 6,111,538 A | 8/2000 | Schuchman et al. |
| 6,133,876 A | 10/2000 | Fullerton et al. |
| 6,141,705 A | 10/2000 | Anand et al. |
| 6,177,903 B1 | 1/2001 | Fullerton et al. |
| 6,178,323 B1 | 1/2001 | Nagata |
| 6,218,979 B1 | 4/2001 | Barnes et al. |
| 6,295,019 B1 | 9/2001 | Richards et al. |
| 6,297,737 B1 | 10/2001 | Irvin |
| 6,297,773 B1 | 10/2001 | Fullerton et al. |
| 6,300,903 B1 | 10/2001 | Richards et al. |
| 6,304,623 B1 | 10/2001 | Richards et al. |
| 6,351,652 B1 | 2/2002 | Finn et al. |
| 6,354,946 B1 | 3/2002 | Finn |
| 6,370,599 B1 | 4/2002 | Anand et al. |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,515,588 B1 | 2/2003 | Sarabia |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,594,628 B1 | 7/2003 | Jacobs et al. |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,693,571 B2 | 2/2004 | Melanson et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,678 B2 | 7/2004 | Arens |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,831,508 B2 | 12/2004 | Shima |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,868,073 B1 | 3/2005 | Carrender |
| 6,879,878 B2 | 4/2005 | Glenn et al. |
| 6,882,301 B2 | 4/2005 | Fullerton |
| 6,895,034 B2 | 5/2005 | Nunally et al. |
| 6,898,414 B2 * | 5/2005 | Ekl et al. ............... 455/3.05 |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,924,700 B2 | 8/2005 | Taura et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,020,701 B1 * | 3/2006 | Gelvin et al. ............ 709/224 |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,034,609 B2 | 4/2006 | Risbo et al. |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,057,456 B2 | 6/2006 | Taura et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |

(56) References Cited

U.S. PATENT DOCUMENTS

| | | | |
|---|---|---|---|
| 7,129,886 B2 | 10/2006 | Hall et al. | |
| 7,132,975 B2 | 11/2006 | Fullerton et al. | |
| 7,145,954 B1 | 12/2006 | Pendergrass et al. | |
| 7,148,791 B2 | 12/2006 | Grisham et al. | |
| 7,151,490 B2 | 12/2006 | Richards | |
| 7,167,525 B2 | 1/2007 | Santhoff et al. | |
| 7,170,408 B2 | 1/2007 | Taylor et al. | |
| 7,184,938 B1 | 2/2007 | Lansford et al. | |
| 7,190,722 B2 | 3/2007 | Lakkis et al. | |
| 7,190,729 B2 | 3/2007 | Siwiak | |
| 7,206,334 B2 | 4/2007 | Siwiak | |
| 7,206,423 B1 | 4/2007 | Feng et al. | |
| 7,209,724 B2 | 4/2007 | Richards et al. | |
| 7,230,980 B2 | 6/2007 | Langford et al. | |
| 7,239,277 B2 | 7/2007 | Fullerton et al. | |
| RE39,759 E | 8/2007 | Fullerton | |
| 7,256,727 B2 | 8/2007 | Fullerton et al. | |
| 7,271,779 B2 | 9/2007 | Hertel | |
| 7,279,965 B2 | 10/2007 | Hansen et al. | |
| 7,286,009 B2 | 10/2007 | Andersen et al. | |
| 7,324,479 B2 | 1/2008 | Hur | |
| 7,348,840 B2 | 3/2008 | Magrath et al. | |
| 7,388,886 B2 | 6/2008 | Perkins et al. | |
| 7,576,605 B2 | 8/2009 | Lee et al. | |
| 8,289,159 B2 | 10/2012 | Julian et al. | |
| 2001/0049471 A1 | 12/2001 | Suzuki et al. | |
| 2002/0100061 A1 | 7/2002 | Tsusaka et al. | |
| 2002/0109501 A1 | 8/2002 | Schroeder | |
| 2003/0002698 A1 | 1/2003 | Ludvigsen | |
| 2003/0078065 A1 | 4/2003 | Hoagland et al. | |
| 2003/0125090 A1 | 7/2003 | Zeira | |
| 2003/0227984 A1 | 12/2003 | Batra et al. | |
| 2004/0001588 A1 | 1/2004 | Hairston | |
| 2004/0032363 A1 | 2/2004 | Schantz et al. | |
| 2004/0062325 A1 | 4/2004 | England et al. | |
| 2004/0128382 A1* | 7/2004 | Shimoda et al. | 709/225 |
| 2004/0164902 A1 | 8/2004 | Karlsson et al. | |
| 2004/0202339 A1 | 10/2004 | O'brien, Jr. et al. | |
| 2004/0203797 A1* | 10/2004 | Burr | 455/445 |
| 2004/0207465 A1 | 10/2004 | Nilsson | |
| 2004/0242250 A1 | 12/2004 | Sasai et al. | |
| 2004/0247023 A1 | 12/2004 | Sasai et al. | |
| 2004/0259449 A1 | 12/2004 | Onder De Linden et al. | |
| 2005/0025117 A1 | 2/2005 | Inagaki et al. | |
| 2005/0107104 A1 | 5/2005 | Rajkotia | |
| 2005/0113157 A1 | 5/2005 | Jaakola | |
| 2005/0138470 A1 | 6/2005 | Cromer et al. | |
| 2006/0016452 A1 | 1/2006 | Goetz et al. | |
| 2006/0026288 A1* | 2/2006 | Acharya et al. | 709/227 |
| 2006/0028272 A1 | 2/2006 | Ozawa et al. | |
| 2006/0089138 A1 | 4/2006 | Smith et al. | |
| 2006/0146751 A1 | 7/2006 | Obuchi et al. | |
| 2006/0166663 A1 | 7/2006 | Haehnichen et al. | |
| 2006/0208794 A1 | 9/2006 | Morishima | |
| 2006/0281476 A1 | 12/2006 | Lane et al. | |
| 2007/0054643 A1 | 3/2007 | Kraegeloh et al. | |
| 2007/0073944 A1 | 3/2007 | Gormley | |
| 2007/0281721 A1 | 12/2007 | Lee et al. | |
| 2008/0009275 A1 | 1/2008 | Werner et al. | |
| 2008/0043824 A1 | 2/2008 | Jacobs et al. | |
| 2008/0045161 A1 | 2/2008 | Lee et al. | |
| 2008/0279167 A1* | 11/2008 | Cardei et al. | 370/342 |

FOREIGN PATENT DOCUMENTS

| | | |
|---|---|---|
| CN | 1723677 A | 1/2006 |
| EP | 851403 A2 | 7/1998 |
| EP | 1469594 | 10/2004 |
| GB | 2388279 | 11/2003 |
| JP | 5180925 | 7/1993 |
| JP | 10190880 A | 7/1998 |
| JP | 11146030 A | 5/1999 |
| JP | 2001169345 | 6/2001 |
| JP | 2001344352 A | 12/2001 |
| JP | 2002517855 A | 6/2002 |
| JP | 2002290944 A | 10/2002 |
| JP | 2003087863 A | 3/2003 |
| JP | 2003202976 A | 7/2003 |
| JP | 2004029182 A | 1/2004 |
| JP | 2004096453 A | 3/2004 |
| JP | 2004507714 T | 3/2004 |
| JP | 2004357281 A | 12/2004 |
| JP | 2005005962 A | 1/2005 |
| JP | 2005020350 A | 1/2005 |
| JP | 2005099018 A | 4/2005 |
| JP | 2005128965 A | 5/2005 |
| JP | 2005202873 A | 7/2005 |
| JP | 2005295380 A | 10/2005 |
| JP | 2006054800 A | 2/2006 |
| JP | 2006054815 A | 2/2006 |
| JP | 2008503011 A | 1/2008 |
| KR | 20030008999 A | 1/2003 |
| TW | 200307141 | 12/2003 |
| TW | I247131 | 1/2006 |
| WO | 9964952 A1 | 12/1999 |
| WO | WO0187014 A2 | 11/2001 |
| WO | WO0194974 | 12/2001 |
| WO | 2004053655 A2 | 6/2004 |
| WO | WO2005083461 A1 | 9/2005 |
| WO | WO2005121959 A2 | 12/2005 |
| WO | 2006/028547 * | 3/2006 |
| WO | 2006028547 A1 | 3/2006 |

OTHER PUBLICATIONS

Galton, Ian: "Delta-Sigma Data Conversion in Wireless Transceivers," IEEE Transactions on Microwave Theory and Techniques, vol. 50, No. 1, (Jan. 1, 2002), IEEE Service Center, pp. 302-315, XP011038571.

Gulden P., et al.: "Wireless local positioning," IEEE Microwave Magazine, IEEE Service Center Piscataway NJ, USA, vol. 4 (4), Dec. 1, 2003, pp. 77-86, XP011107180.

International Search Report and Written Opinion—PCT/US2007/067560, International Search Authority—European Patent Office—Sep. 13, 2007.

Istepanian, R. et al.: "Guest Editorial Introduction to the Special Section on M-health: Beyond Seamless Mobility and Global Wireless Health-Care Connectivity," IEEE Transactions on Information Technology in Biomedicine, vol. 8, No. 4, (Dec. 1, 2004), IEEE Service Center, pp. 405-414, XP011122717.

Jones, V. et al.: "Modelling Mobile Health Systems: An Application of Augmented MDA for the Extended Healthcare Enterprise," Proceedings from the 2005 Ninth IEEE International EDOC Enterprise Computing Conference, The Netherlands, (Sep. 19-23, 2005), Piscataway, NJ, USA, pp. 58-69.

Kredo, K.. II et al..: "Medium Access Control in Wireless Sensor Networks," Computer Networks, (Dec. 28, 2006), pp. 961-994, vol. 51, No. 4, Elsevier Science Publishers BV Amsterdam, NL.

Magrath, A. J. et al.: "Hybrid Pulse Width Modulation/Sigma Delta Modulation Power Digital-to-Analogue Converter," IEEE Proceedings: Circuits Devices and Systems, Institution of Electrial Engineers, Stenvenage, GB, vol. 143, No. 3, (Jun. 10, 1996), pp. 149-156.

Sekine, M. et al.: "An Energy-Effidient Protocol for Active/Sleep Schedule Synchronization in Wireless Sensor Networks," IEEE 2006 Asia-Pacific Conference on Communications, (Aug. 1, 2006), pp. 1-5, XP031024251.

Shi, Z.: "Sigma-Delta ADS and DAC for Digital Wireless Communication." 1999 IEEE Radio Frequency Integrated Circuits Symposium, (Jan. 1, 1999), pp. 57-62.

Sundararaman, B. et al.: "Clock Synchronization for Wireless Sensor Networks: a Survey," Ad Hoc Networks 3, Elsevier, (May 1, 2005), pp. 281-323, University of Illinois, Chicago, IL, USA.

Taiwanese Search Report—096113704—TIPO—Jan. 9, 2011.

(56) References Cited

OTHER PUBLICATIONS

Taiwanese Search report—096114067—TIPO—Nov. 20, 2010.
Taiwanese Search report—096114870—TIPO—Jul. 4, 2010.
Taiwanese Search report—096115093—TIPO—Oct. 11, 2010.
Vasudevan, S. et al.: "Design and Analysis of a Leader Election Algorithm for Mobile Ad Hoc Networks," Proceedings of the 12th IEEE International Conference on Network Protocols, 2004 (ICNP 2004), Berlin, Germany, (Oct. 5, 2004), pp. 350-360.
Xu, et al.: "Distributed computing paradigms for collaborative signal and information processing in sensor networks," (Apr. 2, 2004), Journal of Parallel and Distributed Computing 64, pp. 945-959, XP004525538.

* cited by examiner

DYNAMIC DISTRIBUTION OF DEVICE FUNCTIONALITY AND RESOURCE MANAGEMENT

CLAIM OF PRIORITY UNDER 35 U.S.C. §119

The present application for patent claims priority to U.S. Provisional Patent Application No. 60/795,445, entitled "METHOD FOR DISTRIBUTED DEVICE FUNCTIONALITY AND POWER MANAGEMENT," filed Apr. 26, 2006; and to U.S. Provisional Application No. 60/795,436, entitled "SYSTEM FOR PERSONAL BODY AREA NETWORK MOBILE TELEMETRY AND BIO-SENSING," filed Apr. 26, 2006. Each of the above-identified applications is assigned to the assignee hereof and hereby expressly incorporated by reference herein.

BACKGROUND

1. Field

This application relates generally to communications, and more specifically, to ultra-wide band communication.

2. Background

Wireless technologies enable communications between devices and may be employed for a variety of applications associated with various wireless communication networks such as personal area network ("PAN") and body area network ("BAN"). Devices in such a network may have different functional capabilities and resources. Thus, a need exists for methods and apparatuses for dynamically distributing at least one functionality and managing at least one resource for supporting at least one functionality.

SUMMARY

A summary of sample aspects of the disclosure follows. For convenience, one or more aspects of the disclosure may be referred to herein simply as "some aspects."

Methods and devices or apparatuses of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one will understand how the features of this invention provide advantages that include reduced power consumption and increased functionality from distribution of functionality and power management in, for example, an ultra-wideband (UWB) network.

Some aspects include a method of communicating data. The method includes, at a first device in communication with at least a second device via a wireless link, monitoring at least one resource for performing at least one function. The method further includes determining whether to assign the at least one function to the at least one second device. The determining is based on information that is indicative of at least one function and indicative of at least one resource of the at least one second device. Other aspects include apparatus and devices for communicating data, including-according to one or more aspects of the method. For example, some aspects include devices such as headsets, watches, and medical devices configured to use such methods and apparatuses for communicating data.

DETAILED DESCRIPTION

The following detailed description is directed to certain specific aspects of the invention. However, the invention can be embodied in a multitude of different ways as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, data transmissions disclosed herein may be transmitted on concurrent channels established based on pulse repetition frequencies. In some aspects, concurrent channels may be established based on time hopping sequences. In some aspects, concurrent channels may be established based on pulse repetition frequencies and time hopping sequences.

A body area network comprising one or more devices may define a system that provides distributed functionality as each of these devices (or sub-systems of the devices 102) performs certain functions. Moreover, each device may be powered independently. If a device loses power and is no longer functional, it can affect the capabilities of the system. According, in some aspects, a method, system, and apparatus is provided that manages the overall functionality of the network and to maximize the utilization of available power.

Figure 1:
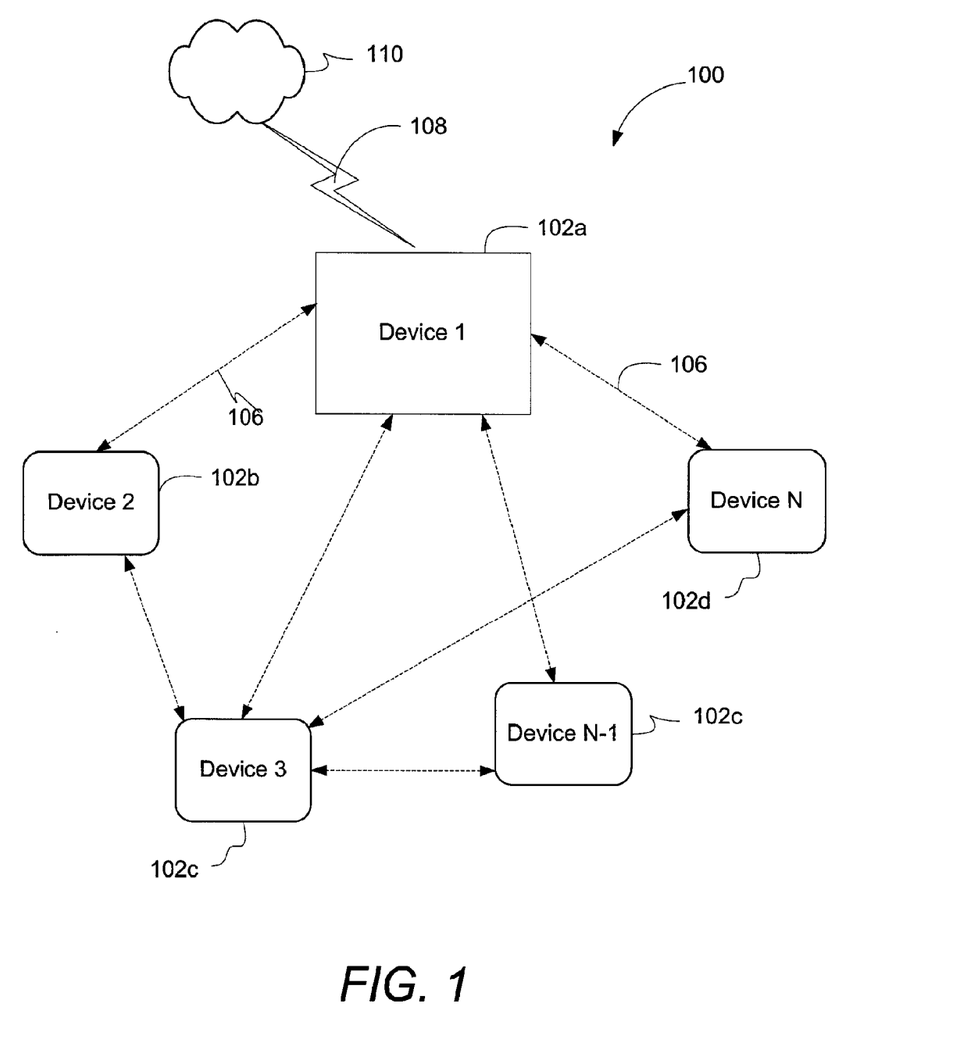
FIG. 1 is a block diagram illustrating an example network of wirelessly connected devices.

FIG. 1 is a block diagram illustrating an example system 100 of wirelessly connected devices 102a, 102b, 102c, and 102d (which are generically referenced herein as the device 102). The system 100 may comprise one or more of a personal area network (PAN) and/or a body area network (BAN). The system 100 may optionally include one or more devices 102a that comprise a longer range, e.g., mobile telephone or other network interface and other device, each of which is configured to communicate over a wireless link 106. Each device 102 may be configured to communicate over the links 106 and at least one other data communications link, e.g., via any suitable wireless or wired network link. The devices 102 may comprise devices such as headsets and watches (or other portable devices configured to display information such as caller id from a phone and/or messages (or portions thereof) such as email, short message system (SMS) messages, or any other type of data, including data received over the wireless links 106 and 108. Other examples of devices 102 may include input/output devices, sensors, and medical devices.

Each of the devices 102 may communicate with one, two, or any number of the other devices 102.

One or more of the devices 102 may detect the presence of the other devices 102 when the other devices 102 initially communicate over the link 106. Two or more devices 102 may be paired through an exchange of messages over the link 106. For example, two devices 102 may pair when one of the two devices 102 first detects (by receiving a message over the wireless link 106) the other device 102. The pairing process may be based at least partly on a user's authorization of the pairing. The paired group of the devices 102 may define a particular personal or body area network.

As discussed further below, in some aspects the communications link 106 a pulsed-based physical layer. For example, the physical layer may utilize ultra-wideband pulses that have a relatively short length (e.g., on the order of a few nanoseconds) and a relatively wide bandwidth. In some aspects, an ultra-wide band may be defined as having a fractional bandwidth on the order of approximately 20% or more and/or having a bandwidth on the order of approximately 500 MHz or more. The fractional bandwidth is a particular bandwidth associated with a device divided by its center frequency. For example, a device according to this disclosure may have a bandwidth of 1.75 GHz with center frequency 8.125 GHz and thus its fractional bandwidth is 1.75/8.125 or 21.5%.

Those skilled in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 2:
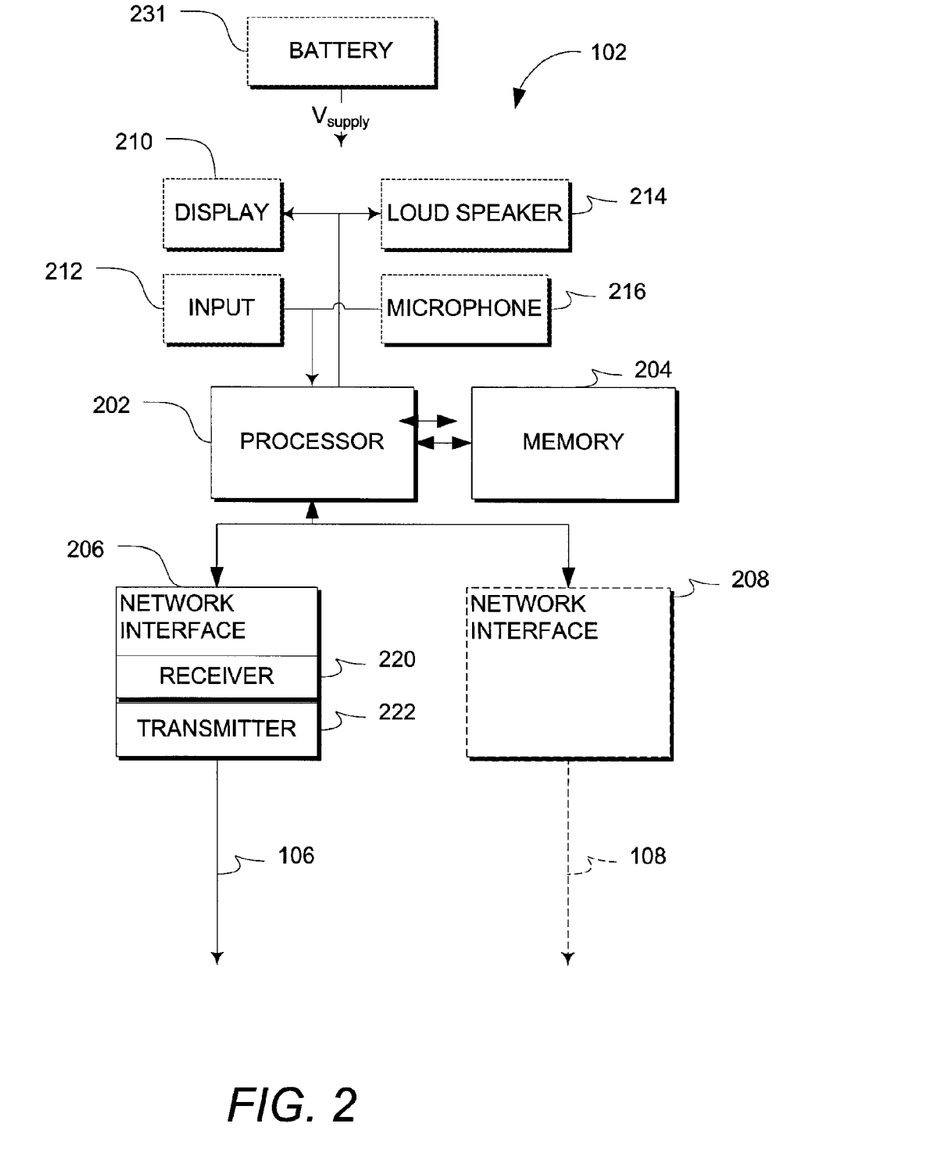
FIG. 2 is a block diagram illustrating an example of a wireless device such as illustrated in FIG. 1.

FIG. 2 is a block diagram illustrating an example of a wireless device 102. The device 102 includes a processor 202 that is in communication with a memory 204 and a network interface 206 for communicating via the wireless link 106. Optionally, the device 102 may also include one or more of a display 210, a user input device 212 such as a key, touch screen, or other suitable tactile input device, a loudspeaker 214 comprising a transducer adapted to provide audible output based on a signal received over the wireless link 106 and/or a microphone 216 comprising a transducer adapted to provide audible input of a signal that may be transmitted over the wireless link 106. For example, a watch may include the display 210 adapted to provide a visual output based on a signal received via the wireless communication link. A medical or other sensor device may include one or more input devices 212 that include a transducer or sensor adapted to generate at least one sensed signal or sensed data to be transmitted via the wireless communication link 106. More examples of devices 102 are discussed below with reference to FIG. 2.

The network interface 206 may include any suitable antenna (not shown), a receiver 220, and a transmitter 222 so that the exemplary device 102 can communicate with one ore more devices over the wireless link 106. Optionally, the network interface 206 may also have processing capabilities to reduce processing requirements of the processor 202.

Optionally, the device 102 may include a second network interface 208 that communicates over the network 110 via a link 108. For example, the device 102 may provide connectivity to the other network 110 (e.g., a wide area network such as the Internet) via a wired or wireless communication link. Accordingly, the device 102 may enable other devices 102 (e.g., a Wi-Fi station) to access the other network. In addition, it should be appreciated that one or more of the devices 102 may be portable or, in some cases, relatively non-portable. The second network interface 208 may transmit and receive RF signals according to the IEEE 802.11 standard, including IEEE 802.11(a), (b), or (g), the BLUETOOTH standard, and/or CDMA, GSM, AMPS or other known signals that are used to communicate within a wireless cell phone network. In addition, the second network interface 208 may comprise any suitable wired network interface such as Ethernet (IEEE 802.3).

The device 102 may optionally include a battery 231 to provide power to one or more components of the device 102. The device 102 may comprise at least one of a mobile handset, a personal digital assistant, a laptop computer, a headset, a vehicle hands free device, or any other electronic device. In addition, the device 102 may comprise one or more of a biomedical sensor, biometric sensor, a pacemaker, or any other device for measuring or affecting a human body. In particular, the teachings herein may be incorporated into (e.g., implemented within or performed by) a variety of the devices 102. For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a biometric sensor (e.g., a heart rate monitor, a pedometer, an EKG device, a keyboard, a mouse, etc.), a user I/O device (e.g., a watch, a remote control, a light switch, etc.), a tire pressure monitor, a computer, a point-of-sale device, an entertainment device, a hearing aid, a set-top box, or any other suitable device.

The components described herein may be implemented in a variety of ways. Referring to FIG. 2, the device or apparatus 102 is represented as a series of interrelated functional blocks that may represent functions implemented by, for example the processor 202, software, some combination thereof, or in some other manner as taught herein. For example, the processor 202 may facilitate user input via the input devices 212. Further, the transmitter 222 may comprise a processor for transmitting that provides various functionality relating to transmitting information to another device 102. The receiver 220 may comprises a processor for receiving that provides various functionalities relating to receiving information from another device 102 as taught herein.

As noted above, FIG. 2 illustrates that in some aspects these components may be implemented via appropriate processor components. These processor components may in some aspects be implemented, at least in part, using structure as taught herein. In some aspects, a processor may be adapted to implement a portion or all of the functionality of one or more of these components. In some aspects one or more of the components represented by dashed boxes are optional.

In some aspects, the device or apparatus 102 may comprise an integrated circuit. Thus, the integrated circuit may comprise one or more processors that provide the functionality of the processor components illustrated in FIG. 2. For example, in some aspects a single processor may implement the functionality of the illustrated processor components, while in other aspects more than one processor may implement the functionality of the illustrated processor components. In addition, in some aspects the integrated circuit may comprise other types of components that implement some or all of the functionality of the illustrated processor components.

Figure 3:
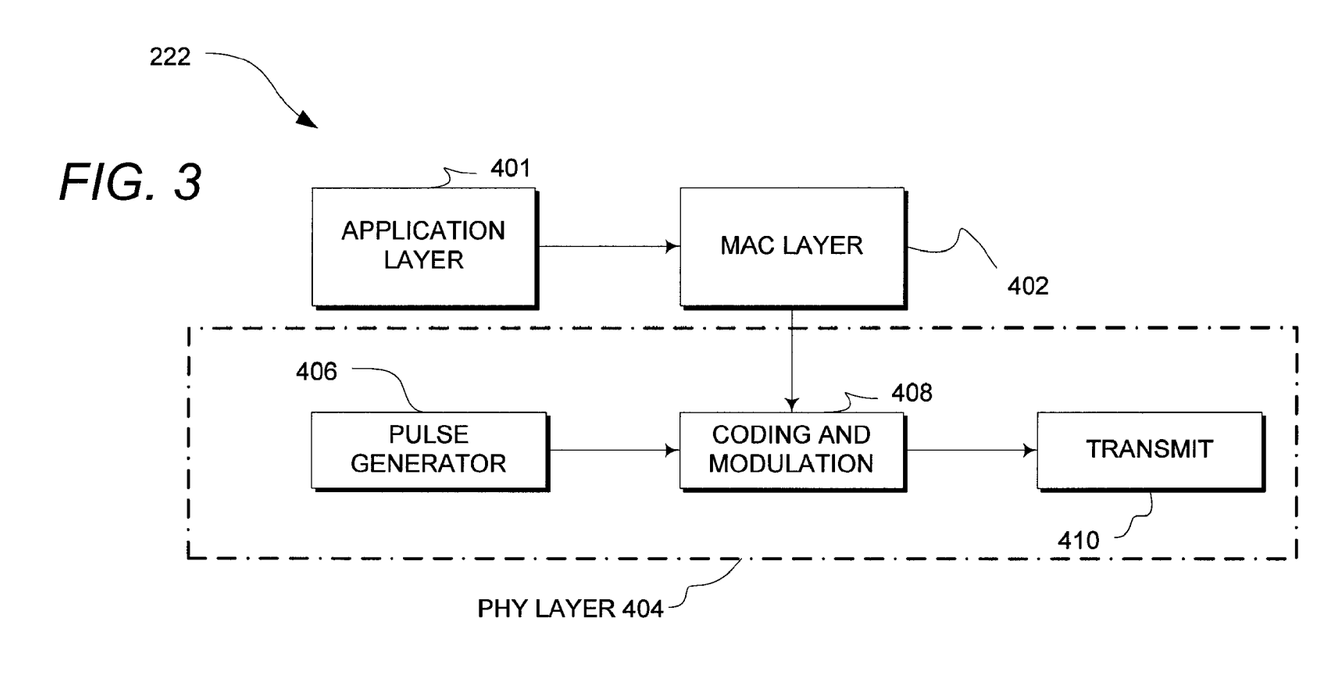
FIG. 3 is a block diagram illustrating a transmitter of a device such as illustrated in FIG. 2.

FIG. 3 is a block diagram illustrating an example of the transmitter 222 of the device 102. As would be apparent to one of skill in the art, in the illustrated block diagram of FIG. 3, logical modules of the device 102 are illustrated in terms of a layered, abstract description for a communications network. As noted below, each layer may comprise one or more logical modules that may be implemented in software, hardware, or any suitable combination of both. The transmitter 222 may include (i) an application layer 401 that provides information to a data link or media access control (MAC) layer 402 for transmission, (ii) a media access control (MAC) layer 402 that receives data from the application layer 401 and provides it to a physical layer 404, and (iii) a physical (PHY) layer 404 that receives data from the MAC layer 402 and transmits the data over the wireless channel 106. In the illustrated transmitter 222, the PHY layer includes a pulse generator 406, a coding and modulation block 408, and a transmit block 410. A phase locked loop (PLL) (not shown) may provide timing signals to the PHY layer. The pulse generator 406 generates waveforms such as Gaussian pulse waveforms. The coding and modulation block 408 codes the information signal provided by the MAC layer 402 using a coding scheme such as convolutional coding, block coding or concatenated coding and modulates the pulse signal based on the coded information signal using a scheme such as pulse position modulation, pulse amplitude modulation, or transmitted reference modulation. The transmit block 410 transmits the modulated pulse signal. Functions of the transmit block 410 may include amplifying the modulated pulse signal for transmission and providing the signal to an antenna.

Figure 4:
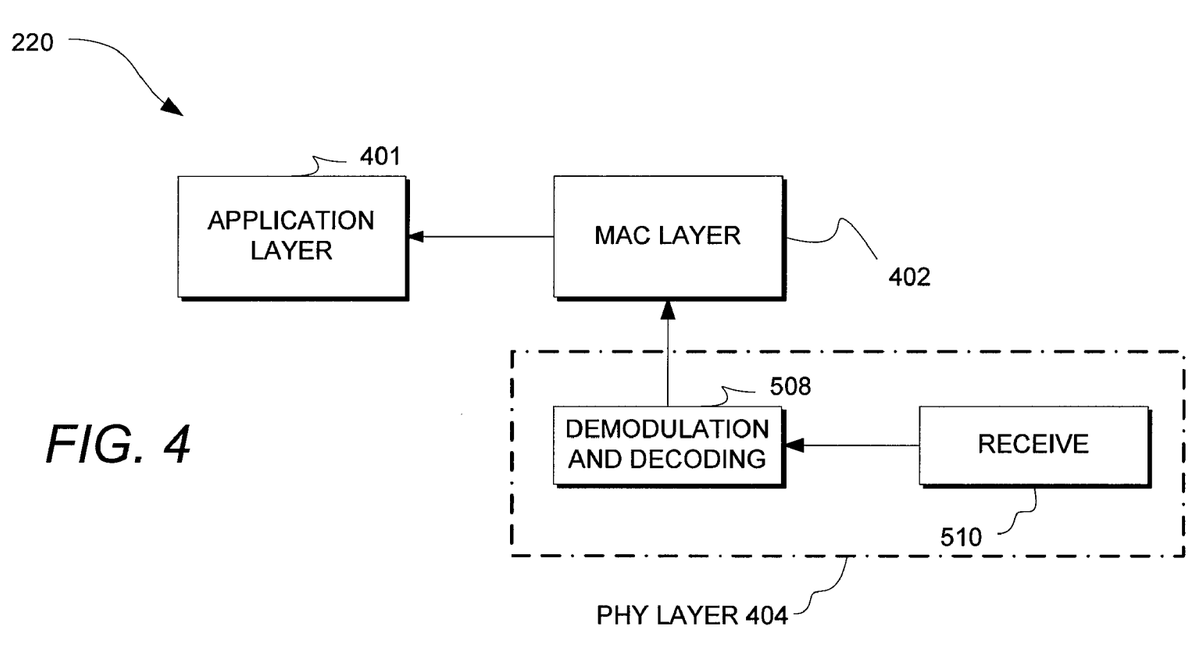
FIG. 4 is a block diagram illustrating a receiver of a device such as illustrated in FIG. 2.

FIG. 4 is a block diagram illustrating an example of the receiver 220 of the device 102. As would be apparent to one of skill in the art, in the illustrated block diagram of FIG. 4, logical modules of the device 102 are illustrated in terms of a layered, abstract description for a communications network. As noted below, each layer may comprise one or more logical modules that may be implemented in software, hardware, or any suitable combination of both. In FIG. 4, the receiver 220 includes the application layer 401 and the MAC layer 402. The PHY layer 404 is in communication with the MAC layer 402. The PHY layer 404 of the receiver includes a demodulation and decoding block 508 and a receive block 510. The receive block 510 may include components (not shown) that may comprise an antenna, a power amplifier, and other suitable receiver components. The receive block 510 receives a wireless signal and provides that signal to the demodulation and decoding block 508, which demodulates and decodes the signal and provides received data to the MAC layer 402.

The receiver 220 and the transmitter 222 may employ a variety of wireless physical layer schemes. For example, the physical layer 404 of the receiver 220 and the transmitter 222 may utilize some form of CDMA, TDMA, OFDM, OFDMA, or other modulation and multiplexing schemes.

Power and/or functionality management is sometimes limited to management of the capabilities of a single device. For example, a user can adjust the backlighting settings of a mobile phone. Similarly, a user can adjust the functionality of a laptop computer to put the device to sleep, dim the screen, or shut down the hard drive when certain conditions are met. Devices 102 in a personal or body area network can be desirably configured to communicate resource information and functional assignment data to distribute functionality between the devices 102 to better utilize power and processing capabilities of the various devices 102. For example, in some aspects, resource consumption associated performing functions of the system 100 can be shifted between devices 102 in the system 100, e.g., from devices 102 that have small power or other resource capabilities to more capable devices 102. Such resources may include battery power, data communication resources, data processing resources, display resources, audio input or output resources, and any other suitable resources of an electronic device 102 (such as the examples of devices 102 discussed above with reference to FIG. 1).

Figure 5:
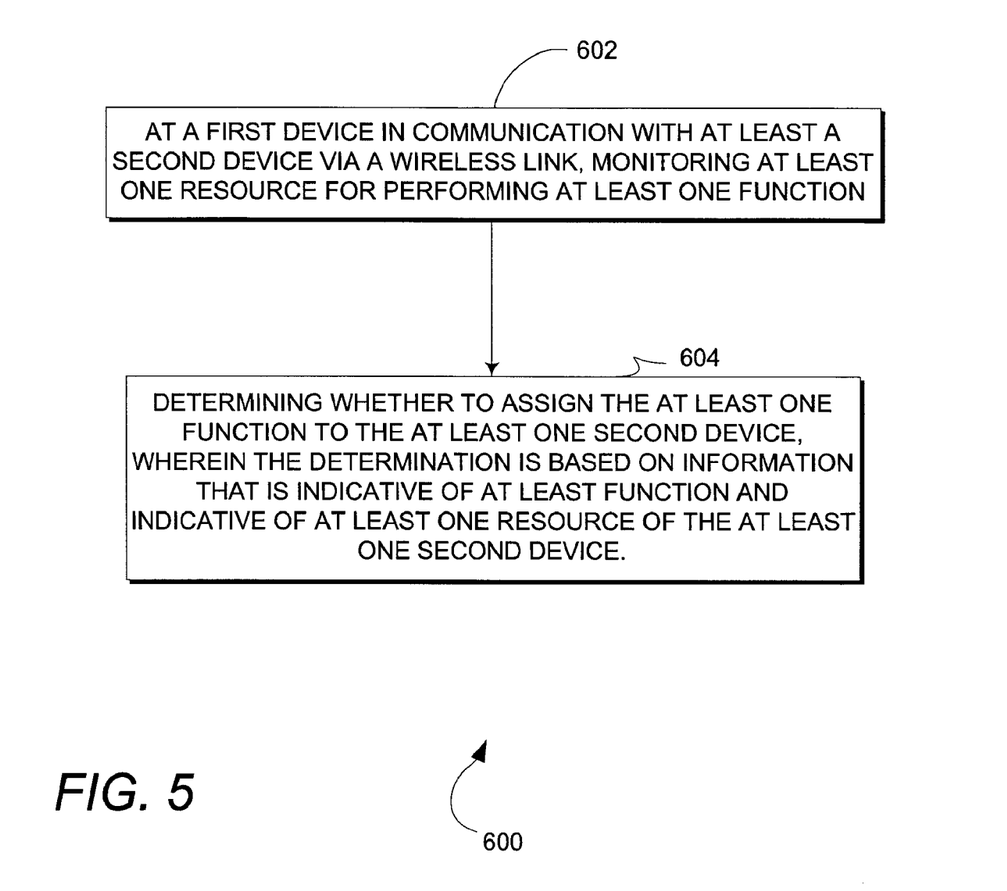
FIG. 5 is a flowchart illustrating an example of a method of allocating processing resources such as in the example network such as illustrated FIG. 1.

FIG. 5 is a flowchart illustrating an example of a method 600 of allocating processing resources such as in the example system 100. The method 600 begins at a block 602 in which, e.g., the processor 202 at a first device 102 (e.g., the device 102a) in communication with at least a second device 102 (e.g., the device 102b) via the wireless link 106, monitors at least one resource for performing at least one function. The resource may comprise resources of the first device 102a, or one or more second devices 102, including the device 102b, in the system 100. Monitoring information about the resource may be communicated via the wireless link 106 periodically to dynamically allocate the function as available resources change over time due to changes in the availability of resources (e.g. power consumption) or availability of devices 102 in the system 100. Alternatively (or in addition), monitoring information about the resource may be communicated via the wireless link 106 when the second device(s) 102b pairs with the first device 102a or when the second device(s) 102b enters or reenters the system 100 (e.g., when the device is powered up or is moved into communications range of the wireless link 106).

Moving to a block 604, the processor 202 of the device 102a determines whether to assign the at least one function to the at least one second device 102b. The determination is based on information that is indicative of the at least function and indicative of the at least one resource of the at least one second device 102b. As noted above, the determination may be based on resource and function data that is received dynamically in time, e.g., based on periodically received resource information as resource availability changes over time. Alternatively, or in addition, the devices 102 such as the device 102b may be configured to provide resource information when resource availability changes or changes by a specified amount. Upon determining that a function is to be assigned, the function may be assigned via the wireless link 106. The function may be assigned to one or more of the second devices, e.g., the devices 102b, 102c, 102d, or may be assigned to the first device 102a, depending on the determination.

The determining may be based on numerous rules or heuristics. For example, the devices 102 may define or specify thresholds reserving a certain percentage of battery for certain functionality (e.g., a mobile handset device 102 may define power limits based on a minimum number of incoming and outgoing voice calls or minutes).

Moreover, in addition to determining to which device 102 a function is to be assigned, the determining may determine when, or if, to assign and perform the function. For example, the determining may adjust the frequency of certain operations (e.g. the polling between external devices 102) based on availability of resources such as battery power at the various devices 102. Further, the determining may be used to adjust when and on which of the devices 102 to perform certain operational settings to allow the system 100 to continue performing in a gracefully degraded mode (e.g. dim displays under certain conditions to preserve power). For example, in an example of the system 100 in which one of the devices 102 is configured to receive or otherwise acquire data (e.g., sensor data), a first of the devices 102, which may be the sensor device 102, a coordinating device 102, or data storage device, may determine based on power or storage resources whether to assign storage of data from the sensor device 102 to a particular one of the devices 102 in the system.

This determination can be dynamic and change over time as resource availability changes. Moreover, the devices 102 can be configured to transfer results of or other information associated with performing certain functions when those functions are assigned to a different device. For example, a particular device such as a mobile handset 102 can store data from a sensor based on a determination regarding the storage function when the sensor device 102 first begins providing sensor data. At a later time, the storage function and the previously stored data can be assigned (and transferred) to another device 102 that can more efficiently receive and store the data or which has greater storage capacity.

The determining may be based on past resource usage, availability of resources, resource capacity, resource reserves, and on predictions of future resource usage or demand, e.g., predictions based on present usage. For example, the determining may be based on predicting future usage and remaining battery life based on individual battery states of one or more of the devices 102. The determining may be formulated as an optimization problem based on an objective function to be maximized or minimized. An objective function may include a cost function or any suitable functional relationship derived from any objective such as maximizing, minimizing, or otherwise substantially optimizing consumption of a resource such as power reserves, storage. The calculation of the objective function may be based on one or more resources of one or more of the devices 102 so as to allow the objective function to optimize for an individual device or to optimize resources across a number of devices. Moreover, the objective function may be calculated based on resources of each device that may be the same or different. For example, the objective function may consider tradeoffs of memory versus storage versus communications costs by being based on both types of resources. Resources (functionality and power) may then be allocated over time based on various factor such as definitions of functions or demands to be provided by a particular example of the system 100, a definition of the devices 102 in the particular example system 100 and the power or functionality provided by each of the devices 102. In some aspects, certain functionality may be provided by multiple sources (e.g. storage capabilities).

As noted above, the determining may be based on particular constraints or threshold associated with the overall example of the system 100 or of the particular devices 102 in the system, or particular resources of the devices 102. For example, a user may configure a setting on one or more of the devices 102 directing the device 102 to maintain a certain amount of power for emergency situations. The determining may therefore be based on maintaining this reserve and functions such as processing data, storing data, or communicating data assigned to a different device 102 to maintain this reserve.

By optimizing resource utilization, functionality can be shifted to devices that are more efficient, or which can more efficiently perform the particular function at a particular time, resulting in prolonged battery life, at least in aggregate. For example, certain conditions may trigger the display in the mobile device to be powered off and information conveyed in an alternate display of a watch that may consume less power. Similarly, if a given resource is unavailable (e.g. phone-based storage), this functionality can be shifted to another device (e.g. audio player) that can temporarily perform this function (storage) and then forward the stored data when the primary device becomes available. Thus, for example, the device 102a may assign an intermediate storage function to the device 102b, which may subsequently transfer the data to another device 102c. Continuing this example, the data stored on the device 102b may be generated by another device such as the device 102d.

Examples of the system 100 may include a network coordinator device (NCD) 102a that is configured to perform the determining and/or assignment of functions. In other examples of the system 100, each device 102a determines whether to assign particular functions to one or more other devices 102b in the system 100 and instructs or requests that other device 102b to perform the function based on the determination. The device 102b may perform the function and provide results back to the device 102a, or to another device 102c or 102d. Thus, the function may be offloaded from one of the devices 102a, 102c, or 102d, to the device 102b and the results returned to the corresponding device 102a, 102c, or 102d for further processing or action based on any results of performing the function.

In one example of the system 100, the device 102a comprises a headset that has one or more resources for performing particular functions (e.g., MP3 decompression, echo cancellation, side tone, etc). Based on monitoring such resources of another device 102b, which may comprise a mobile handset, that has similar capabilities, the headset 102 may assign those functions to itself or to the headset. The determination of where to assign the function may be based on power reserves of each device, and may change over time. For example, the headset 102a may assign one or more of the functions to the handset 102b and shut down its own resources (e.g., circuits) for performing those functions to save power locally. Further, at a later time when the battery of the handset 102b drops below a specified or defined threshold, the headset 102a reassigns the MP3 decompression to its own decompression circuit. Similarly, the headset 102a may stream MP3 music from a FLASH dongle device 102c that does not have MP3 decompression resources and assign and perform this function to itself (the headset 102a).

In another example, a heart rate monitor sensor 102a may send measured heart rate to a watch device 102b. Later, based on monitoring power resources, the heart rate monitor may offload the heart rate calculation and assign the heart rate determination to a mobile handset device 102c, to which the heart sensor 102 a sends raw sensor data. The handset device 102c then sends the measured heart rate the watch device 102b. In addition, if for example the heart rate monitor maintains a log of heart rate over time, the handset 102c may also send the measured heart rate back to the sensor 102a for logging. Alternatively, the heart rate sensor 102a may also determine that it should offload the logging to another device 102, such as the mobile handset 102c based on power or storage requirements. The mobile handset 102c may comprise intermediate storage until another device such as a laptop 102d connects to the sensor 102a to obtain the log. The sensor 102a may direct the laptop 102d to at least partly obtain the log from the handset 102c.

Figure 6:
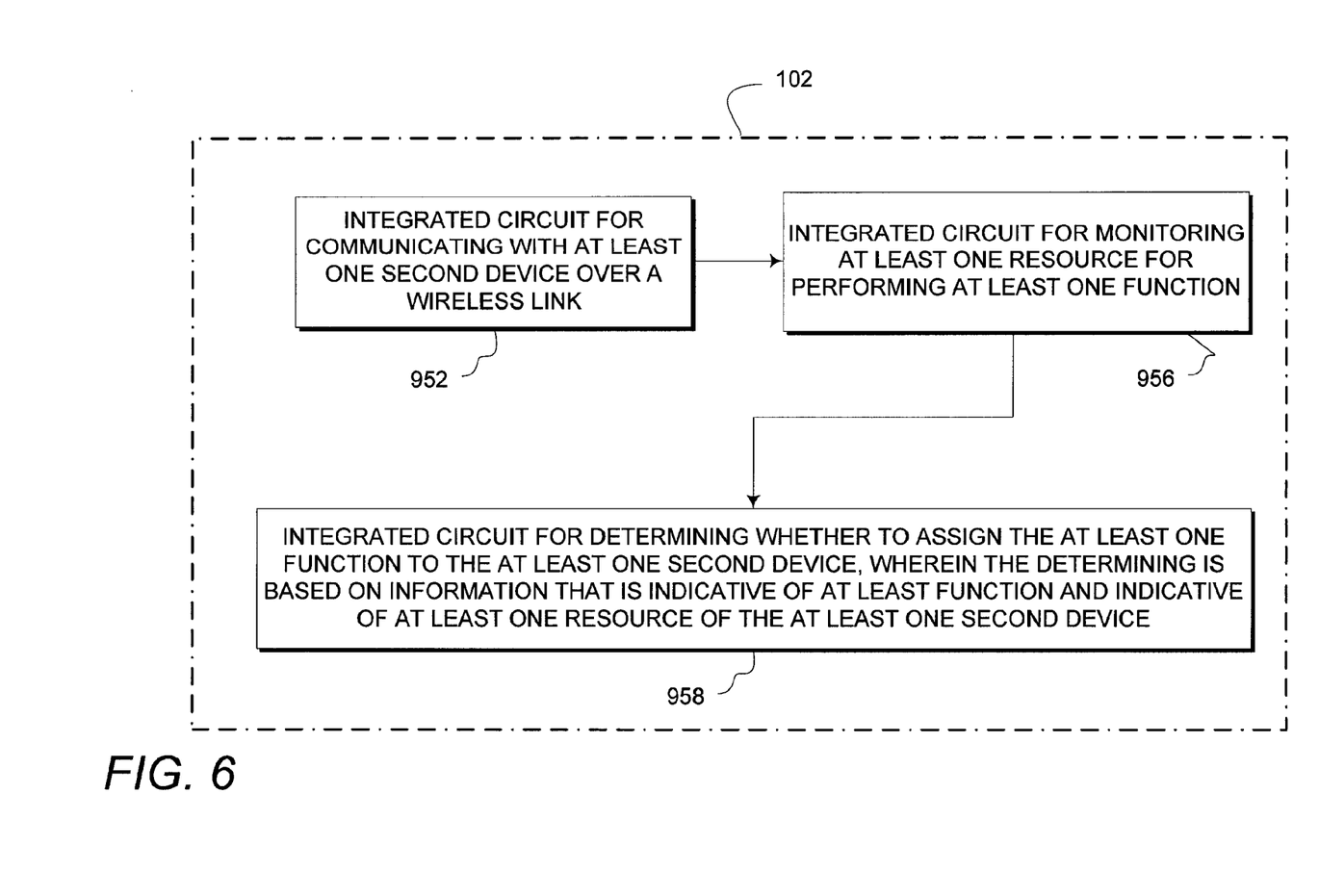
FIG. 6 is a block diagram illustrating an example of the device that allocates processing resources using a method such as illustrated in FIG. 5.

FIG. 6 a block diagram illustrating an example of the device 102 that allocates processing resources using the method 600 of FIG. 5. In the illustrated example, the device 102 comprises a means or an integrated circuit (IC) 952 for communicating with at least one second device 102 over a wireless link 106. The IC 952 may comprise the receiver 220 and transmitter 222 of FIGS. 2-4. The device 102 also comprises a means or an IC 956 for monitoring at least one resource for performing at least one function. The IC 956 may comprise the processor 202 of FIG. 2. The device 102 also comprises a means or an IC 958 for determining whether to assign the at least one function to the at least one second device 102. The determining is based on information that is indicative of at least function and indicative of at least one resource of the at least one second device 102. The IC 958 may comprise the processor 202 of FIG. 2.

In view of the above, one will appreciate that the disclosure addresses how to enhance functionality such as battery life, including managing and adjusting the functionality and power consumption of multiple devices configured in a body area network and adjusting and/or shifting functionality from one device to another based on specified thresholds. In some aspects, an objective function defined for a collection of devices by allocating functionality and power across multiple devices can be maximized or minimized. Accordingly, resources of individual devices 102 may be shared across the system 100 in a way that decreases degradation due to failures or lack of available power in a particular device 102.

Any illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those skilled in the art will recognize that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various aspects, it will be understood that various omissions, substitutions, and changes in the form and details of the device or process illustrated may be made by those skilled in the art without departing from the scope of this disclosure. As will be recognized, the invention may be embodied within a form that does not provide all of the features and benefits set forth herein, as some features may be used or practiced separately from others. The scope of this disclosure is defined by the appended claims, the foregoing description or both. All changes which come within the meaning and range of equivalency of the claims are to be embraced within their scope.

The invention claimed is:

1. A method of wireless communications, comprising:
at a first device in communication with at least one second device via a wireless link, monitoring at least one resource for performing at least one function;
determining whether to assign the at least one function to the at least one second device, wherein the determination is based on information that is indicative of the at least one function and indicative of at least one resource of the at least one second device, wherein the information comprises information indicative of a distance between the first device and the at least one second device, and further wherein the information comprises duty cycle of at least one of the first device or the at least one second device; and
adjusting a rate at which the at least one function is performed based on the determination.

2. The method of claim 1, further comprising assigning the at least one function to the first device based on the determination.

3. The method of claim 1, further comprising, based on the determination, transmitting a signal to the at least one second device via the wireless link, the signal comprising data indicative of assigning the at least one function to the at least one second device.

4. The method of claim 3, further comprising receiving, at the first device from the at least one second device, data indicative of at least one result of performing the at least one function.

5. The method of claim 1, wherein the information comprises at least one channel condition of the wireless link between the first device and the at least one second device.

6. The method of claim 1, wherein the information comprises at least one of power reserve of at least one of the first device and the at least one second device, and power capacity of at least one of the first device and the at least one second device.

7. The method of claim 1, wherein the information comprises information indicative of an estimate of future resource consumption of the at least one second device.

8. The method of claim 7, wherein the estimate is an estimate of battery power consumption over a time period.

9. The method of claim 1, wherein the determination is based at least partly on information indicative of an estimate of future resource consumption of the first device.

10. The method of claim 1, wherein the determination comprises calculating at least one objective function based on at least one resource of the first device and the at least one second device.

11. The method of claim 1, wherein the monitoring comprises comparing the information that is indicative of at least one resource of the at least one second device to a defined threshold.

12. The method of claim 11, wherein the determination is based on the comparison.

13. The method of claim 1, further comprising assigning the at least one function to a third device based on the determination.

14. The method of claim 1, wherein the determination is based at least partly on comparing information indicative of resources of the first device to a defined threshold.

15. The method of claim 1, wherein the at least one function comprises at least one of displaying information, storing information, and communicating information.

16. The method of claim 1, wherein the at least one function comprises storing data provided by at least one third device.

17. The method of claim 1, wherein the distance is determined based on a signal communicated via the wireless link between the first device and the at least one second device.

18. The method of claim 1, wherein the first device and the at least one second device are associated with a body area network or a personal area network.

19. The method of claim 1, wherein the monitoring comprises periodically receiving information indicative of the at least one resource from the at least one second device at the first device and wherein the determination is based on the periodically received information.

20. The method of claim 1, further comprising receiving a pairing message from the at least one second device at the first device, wherein the pairing message comprises the information indicative of the at least one resource of the at least one second device.

21. The method of claim 1, further comprising receiving a signal comprising at least one pulse via the wireless link.

22. The method of claim 21, wherein the at least one pulse has a fractional bandwidth of at least about 20%, has a bandwidth of at least about 500 MHz, or has a fractional bandwidth of at least about 20% and has a bandwidth of at least about 500 MHz or more.

23. An electronic device for wireless communications, comprising:
a transceiver configured to communicate with at least one other device over a wireless link; and
a processor configured to:
monitor at least one resource for performing at least one function;
determine whether to assign the at least one function to the at least one other device, wherein the processor is further configured to determine based on information that is indicative of the at least one function and indicative of at least one resource of the at least one other device, wherein the information comprises information indicative of a distance between the electronic device and the at least one other device, and further wherein the information comprises duty cycle of at least one of the electronic device or the at least one other device; and
adjust a rate at which the at least one function is performed based on the determination.

24. The device of claim 23, wherein the processor is further configured to assign the at least one function to the electronic device, based on the determination.

25. The device of claim 23, wherein the transceiver is further configured to transmit, based on the determination, data indicative of assigning the at least one function to the at least one other device.

26. The device of claim 25, wherein the transceiver is further configured to receive, from the at least one other device, data indicative of at least one result of performing the at least one function.

27. The device of claim 23, wherein the information comprises in at least one channel condition of the wireless link.

28. The device of claim 23, wherein the information comprises at least one of power reserves of at least one of the electronic device and the at least one other device, and power capacity of at least one of the electronic device and the at least one other device.

29. The device of claim 23, wherein the information comprises information indicative of an estimate of future resource consumption of the at least one other device.

30. The device of claim 29, wherein the estimate is an estimate of battery power consumption over a time period.

31. The device of claim 23, wherein the information comprises information indicative of an estimate of future resource consumption of the electronic device.

32. The device of claim 23, wherein the determination comprises calculating at least one objective function based on at least one resource of the electronic device and the at least one other device.

33. The device of claim 23, wherein the processor is further configured to compare the information that is indicative of at least one resource of the at least one other device to a defined threshold.

34. The device of claim 33, wherein the determination is based on the comparison.

35. The device of claim 23, wherein the processor is further configured to assign the at least one function to a third device based on the determination.

36. The device of claim 23, wherein the processor is further configured to determine based at least partly on comparing information indicative of resources of the electronic device to a defined threshold.

37. The device of claim 23, wherein the at least one function comprises at least one of displaying information, storing information, or communicating information.

38. The device of claim 23, wherein the at least one function comprises storing data provided by at least one third device.

39. The device of claim 23, wherein the distance is determined based on a signal communicated via the wireless link.

40. The device of claim 23, wherein the wireless link comprises at least one of a body area network and a personal area network.

41. The device of claim 23, wherein the transceiver is further configured to periodically receive information indicative of the at least one resource from the at least one other device and wherein the processor is further configured to monitor and determine based on the periodically received information.

42. The device of claim 23, wherein the transceiver is further configured to receive a pairing message from the at least one other device, and wherein the pairing message comprises information indicative of the at least one resource of the at least one other device.

43. The device of claim 23, wherein the transceiver is further configured to receive at least one pulse via the wireless link.

44. The device of claim 43, wherein the at least one pulse has a fractional bandwidth of at least about 20%, has a bandwidth of at least about 500 MHz, or has a fractional bandwidth of at least about 20% and has a bandwidth of at least about 500 MHz or more.

45. An electronic device for wireless communications, comprising:
means for communicating with at least one other device over a wireless link;

means for monitoring at least one resource for performing at least one function;

means for determining whether to assign the at least one function to the at least one other device, wherein the determining means is configured to determine based on information that is indicative of the at least one function and indicative of at least one resource of the at least one other device, wherein the information comprises information indicative of a distance between the electronic device and the at least one other device, and further wherein the information comprises duty cycle of at least one of the electronic device or the at least one other device; and means for adjusting a rate at which the at least one function is performed based on the determination.

46. The device of claim 45, further comprising means for assigning the at least one function to the electronic device, based on the determination.

47. The device of claim 45, wherein the communicating means is configured to transmit a signal to the at least one other device that is indicative of assigning the at least one function to the at least one other device.

48. The device of claim 47, wherein the communicating means is further configured to receive, from the at least one other device, data indicative of at least one result of performing the at least one function.

49. The device of claim 45, wherein the information comprises at least one channel condition of the wireless link.

50. The device of claim 45, wherein the information comprises at least one of power reserves of at least one of the electronic device and the at least one other device, and power capacity of at least one of the electronic device and the at least one other device.

51. The device of claim 45, wherein the information comprises information indicative of an estimate of future resource consumption of the at least one other device.

52. The device of claim 51, wherein the estimate is an estimate of battery power consumption over a time period.

53. The device of claim 45, wherein the information comprises information indicative of an estimate of future resource consumption of the electronic device.

54. The device of claim 45, wherein the determination comprises calculating at least one objective function based on at least one resource of the electronic device and the at least one other device.

55. The device of claim 45, wherein the monitoring means is configured to compare the information that is indicative of at least one resource of the at least one other device to a defined threshold.

56. The device of claim 55, wherein the determination is based on the comparison.

57. The device of claim 45, further comprising means for assigning the at least one function to a third device based on the determination.

58. The device of claim 45, wherein the determining means is further configured to determine based at least partly on comparing information indicative of resources of the electronic device to a defined threshold.

59. The device of claim 45, wherein the at least one function comprises at least one of displaying information, storing information, or communicating information.

60. The device of claim 45, wherein the at least one function comprises storing data provided by at least one third device.

61. The device of claim 45, wherein the distance is determined based on a signal communicated via the wireless link.

62. The device of claim 45, wherein the wireless link comprises at least one of a body area network and a personal area network.

63. The device of claim 45, wherein the communicating means is configured to periodically receive information indicative of the at least one resource from the at least one other device, and wherein the monitoring means is configured to monitor based on the periodically received information, and wherein the determining means is configured to determine based on the periodically received information.

64. The device of claim 45, wherein the communicating means is configured to receive a pairing message from the at least one other device, and wherein the pairing message comprises information indicative of the at least one resource of the at least one other device.

65. The device of claim 45, wherein the communicating means is configured to receive at least one pulse via the wireless link.

66. The device of claim 65, wherein the at least one pulse has a fractional bandwidth of at least about 20%, has a bandwidth of at least about 500 MHz, or has a fractional bandwidth of at least about 20% and has a bandwidth of at least about 500 MHz or more.

67. A computer-program product for wireless communications, comprising:

non-transitory computer-readable storage medium comprising codes executable by at least one computer to:
at a first device in communication with at least a second device via a wireless link, monitor at least one resource for performing at least one function;
determine whether to assign the at least one function to the at least one second device, wherein the determination is based on information that is indicative of the at least one function and indicative of at least one resource of the at least one second device, wherein the information comprises information indicative of a distance between the first device and the at least one second device, and further wherein the information comprises duty cycle of at least one of the first device or the at least one second device; and
adjust a rate at which the at least one function is performed based on the determination.

68. A headset for wireless communications, comprising:
a transceiver configured to communicate with at least one other device over a wireless link;
a microphone adapted to provide sensed data to be transmitted via the wireless link; and
a processor configured to:
monitor at least one resource for performing at least one function on the sensed data;
determine whether to assign the at least one function to the at least one other device, wherein the processor is further configured to determine based on information that is indicative of the at least one function and indicative of the at least one resource of the at least one other device, wherein the information comprises information indicative of a distance between the headset and the at least one other device, and further wherein the information comprises duty cycle of at least one of the headset or the at least one other device; and
adjust a rate at which the at least one function is performed based on the determination.

69. A watch for wireless communications, comprising:
a transceiver configured to communicate with at least one other device over a wireless link;

a processor configured to:
monitor at least one resource for performing at least one function;
determine whether to assign the at least one function to the at least one other device, wherein the processor is further configured to determine based on information that is indicative of the at least one function and indicative of at least one resource of the at least one other device, wherein the information comprises information indicative of a distance between the watch and the at least one other device, and further wherein the information comprises duty cycle of at least one of the watch or the at least one other device; and
adjust a rate at which the at least one function is performed based on the determination; and
a display adapted to provide a visual output based on at least one pulse received via the wireless link.

70. A medical device for wireless communications, comprising:
a transceiver configured to communicate with at least one other device over a wireless link;
a sensor adapted to provide sensed data to be transmitted via the wireless link; and
a processor configured to:
monitor at least one resource for performing at least one function on the sensed data;
determine whether to assign the at least one function to the at least one other device, wherein the processor is further configured to determine based on information that is indicative of the at least one function and indicative of at least one resource of the at least one other device, wherein the information comprises information indicative of a distance between the medical device and the at least one other device, and further wherein the information comprises duty cycle of at least one of the medical device or the at least one other device; and
adjust a rate at which the at least one function is performed based on the determination.

71. A sensor for wireless communications, comprising:
a transceiver configured to communicate with at least one other device over a wireless link;
a transducer adapted to provide sensed data to be transmitted via the wireless link; and
a processor configured to:
monitor at least one resource for performing at least one function on the sensed data;
determine whether to assign the at least one function to the at least one other device, wherein the processor is further configured to determine based on information that is indicative of the at least one function and indicative of at least one resource of the at least one other device, wherein the information comprises information indicative of a distance between the sensor and the at least one other device, and further wherein the information comprises duty cycle of at least one of the sensor or the at least one other device; and
adjust a rate at which the at least one function is performed based on the determination.

* * * * *